United States Patent
Matsumoto (10) Patent No.: US 7,433,140 B2
(45) Date of Patent: Oct. 7, 2008

(54) RECORDING AND PLAYBACK APPARATUS, RECORDING CONTROLLING METHOD, AND RECORDING MEDIUM

(75) Inventor: Kissei Matsumoto, Kanagawa (JP)

(73) Assignee: Sony Corporation, Tokyo (JP)

(*) Notice: Subject to any disclaimer, the term of this patent is extended or adjusted under 35 U.S.C. 154(b) by 190 days.

(21) Appl. No.: 11/146,903

(22) Filed: Jun. 7, 2005

(65) Prior Publication Data
US 2006/0001995 A1   Jan. 5, 2006

(30) Foreign Application Priority Data
Jun. 10, 2004  (JP)  ............................ P2004-172392

(51) Int. Cl.
*G11B 27/36*  (2006.01)
(52) U.S. Cl. .......................................... 360/31; 360/53
(58) Field of Classification Search ........................ None
See application file for complete search history.

(56) References Cited

U.S. PATENT DOCUMENTS

| | | | | |
|---|---|---|---|---|
| 4,685,303 | A * | 8/1987 | Branc et al. ................... 360/69 |
| 5,084,791 | A * | 1/1992 | Thanos et al. ............. 360/77.04 |
| 6,405,277 | B1 * | 6/2002 | Jen et al. ...................... 360/75 |
| 6,501,611 | B1 * | 12/2002 | Li ............................... 360/67 |
| 6,867,939 | B2 * | 3/2005 | Katahara et al. .............. 360/53 |
| 6,970,310 | B2 * | 11/2005 | Kawaguchi et al. ............ 360/31 |
| 7,019,934 | B1 * | 3/2006 | Andersen ...................... 360/75 |
| 7,184,241 | B1 * | 2/2007 | Mallary et al. ............. 360/78.04 |

| | | | |
|---|---|---|---|
| 2003/0081337 | A1 * | 5/2003 | Tanimoto ...................... 360/60 |
| 2004/0042105 | A1 * | 3/2004 | Cho ............................ 360/31 |

FOREIGN PATENT DOCUMENTS

| | | |
|---|---|---|
| JP | 61-096572 | 5/1986 |
| JP | 06-036474 | 2/1994 |
| JP | 2000-113563 | 4/2000 |
| JP | 2003-296903 | 10/2003 |
| JP | 2003-331523 | 11/2003 |

OTHER PUBLICATIONS

U.S. Appl. No. 11/155,873 cited by applicant in the IDS (without form 1449) of Sep. 1, 2005.*

* cited by examiner

*Primary Examiner*—Hoa T. Nguyen
*Assistant Examiner*—James L Habermehl
(74) *Attorney, Agent, or Firm*—Wolf, Greenfield & Sacks, P.C.

(57) ABSTRACT

A recording and playback apparatus includes a recording and playback unit recording a signal on a storage medium and playing back the signal recorded on the storage medium, the recording and playback unit at least having a magnetic head; a temperature detector detecting a temperature; and a controller executing a test writing controlling process of controlling the recording and playback unit so that a test writing operation on the storage medium is executed according to a result of temperature detection by the temperature detector, executing a checking process of checking whether a signal has been correctly written by the test writing operation, and executing a recording controlling process of controlling a recording operation on the storage medium by the recording and playback unit according to a result of the checking in the checking process.

12 Claims, 5 Drawing Sheets

RECORDING AND PLAYBACK APPARATUS, RECORDING CONTROLLING METHOD, AND RECORDING MEDIUM

CROSS REFERENCES TO RELATED APPLICATIONS

The present invention contains subject matter related to Japanese Patent Application JP 2004-172392 filed in the Japanese Patent Office on Jun. 10, 2004, the entire contents of which are incorporated herein by reference.

BACKGROUND OF THE INVENTION

1. Field of the Invention

The present invention relates to a recording and playback apparatus relating to a storage medium on which signals are recorded using at least a magnetic head, and a recording controlling method particularly suitable for such a recording and playback apparatus. Also, the present invention relates to a program for implementing such a recording and playback apparatus and recording controlling method, and a recording medium having recorded the program thereon.

2. Description of the Related Art

It is known regarding storage media on which signals are recorded using a magnetic head, such as hard disks, that recording performance is degraded at low temperature due to magnetic characteristics.

For example, recording and playback apparatuses including hard disk drives (HDDs), intended for automotive applications or portable applications, are supposed to be used outdoors, so that the degradation of recording performance at low temperature is considered to be particularly problematic.

In some recording and playback apparatuses including HDDs, intended for portable applications, it is possible with the apparatuses alone to perform editing such as editing a title, editing a play list, or removing a file, so that such editing can be performed outdoors.

Such editing operations involve recording of file management information. Thus, when the operations are performed outdoors at low temperature, management data could get corrupted. If management data gets corrupted, playback of a file could be disabled, need for reformatting could arise, or other problems could occur.

Thus, for example, a temperature sensor is provided for an HDD, and control is exercised so that recording operations are not allowed below a predetermined temperature.

That is, with reference to a predetermined temperature value defined as a recording permitting temperature, recording operations are not allowed below the temperature value while recording operations are allowed at or above the temperature value, so that corruption of data by recording operations at low temperature can be prevented.

As a related art, Japanese Unexamined Patent Application Publication No. 9-148902 describes techniques for heating an HDD at low temperature to raise the temperature quickly to the recording permitting temperature.

SUMMARY OF THE INVENTION

However, when recording operations are prohibited below a predetermined temperature value as described above, the recording permitting temperature for recording at low temperature actually varies among individual HDDs. Thus, the predetermined temperature value should be chosen to be somewhat higher by a certain margin in consideration of variation in low-temperature recording characteristics of the individual HDDs. Furthermore, in order to prevent data corruption effectively, even a higher temperature value with a margin for that purpose should be chosen.

However, when a value with a margin is chosen in the way described above, for example, in the case of an HDD having favorable characteristics, a recording operation could be prohibited even if recording is actually allowable.

That is, according to the related art in which recording is simply prohibited whenever the temperature is below the predetermined temperature value, recording operations could be excessively restricted.

It is desired that a recording and playback apparatus described below be provided.

According to an embodiment of the present invention, a recording and playback apparatus is provided. The recording and playback apparatus includes recording and playback means for recording a signal on a storage medium and for playing back the signal recorded on the storage medium, the recording and playback means at least having a magnetic head; temperature detecting means for detecting a temperature; and controlling means for executing a test writing controlling process of controlling the recording and playback means so that a test writing operation on the storage medium is executed according to a result of temperature detection by the temperature detecting means, for executing a checking process of checking whether a signal has been correctly written by the test writing operation, and for executing a recording controlling process of controlling a recording operation on the storage medium by the recording and playback means according to a result of the checking in the checking process.

According to another embodiment of the present invention, a recording controlling method for a recording and playback apparatus including recording and playback means for recording a signal on a storage medium and for playing back the signal recorded on the storage medium, the recording and playback means at least having a magnetic head, and including temperature detecting means for detecting a temperature, is provided. The recording controlling method includes the steps of controlling the recording and playback means so that a test writing operation on the storage medium is executed according to a result of temperature detection by the temperature detecting means; checking whether a signal has been correctly written by the test writing operation; and controlling a recording operation on the storage medium by the recording and playback means according to a result of the checking.

According to another embodiment of the present invention, a recording medium having recorded thereon a program that is executed by a microcomputer of a recording and playback apparatus including recording and playback means for recording a signal on a storage medium and for playing back the signal recorded on the storage medium, the recording and playback means at least having a magnetic head, and including temperature detecting means for detecting a temperature, is provided. The program includes the steps of controlling the recording and playback means so that a test writing operation on the storage medium is executed according to a result of temperature detection by the temperature detecting means; checking whether a signal has been correctly written by the test writing operation; and controlling a recording operation on the storage medium by the recording and playback means according to a result of the checking.

According to these embodiments of the present invention, the test writing operation serves to check whether recording is allowable or not allowable based on a result of actually executing recording on a storage medium.

Furthermore, the test writing operation may be executed based on a result of temperature detection by the temperature detection means.

According to the embodiments of the present invention, since it is possible to check whether recording is allowable or not allowable based on a result of actually executing recording on a storage medium, excessive restriction on recording can be avoided. By avoiding excessive restriction on recording, a recording operation can be performed at a lower temperature compared with the related art.

Furthermore, since the recording operation is controlled based on a result of actually executing recording, recording operations can be reliably prevented when recording is unallowable. Accordingly, corruption of data at low temperature can be prevented reliably.

In this case, the test writing operation can be executed based on a result of temperature detection by the temperature detecting means, for example, only when the temperature is below a predetermined temperature. Thus, unneeded test writing operations in a temperature range in which recording is allowable can be omitted. This serves to reduce inefficient processing load and power consumption.

DESCRIPTION OF THE PREFERRED EMBODIMENTS

Now, embodiments of the present invention will be described.

Figure 1:
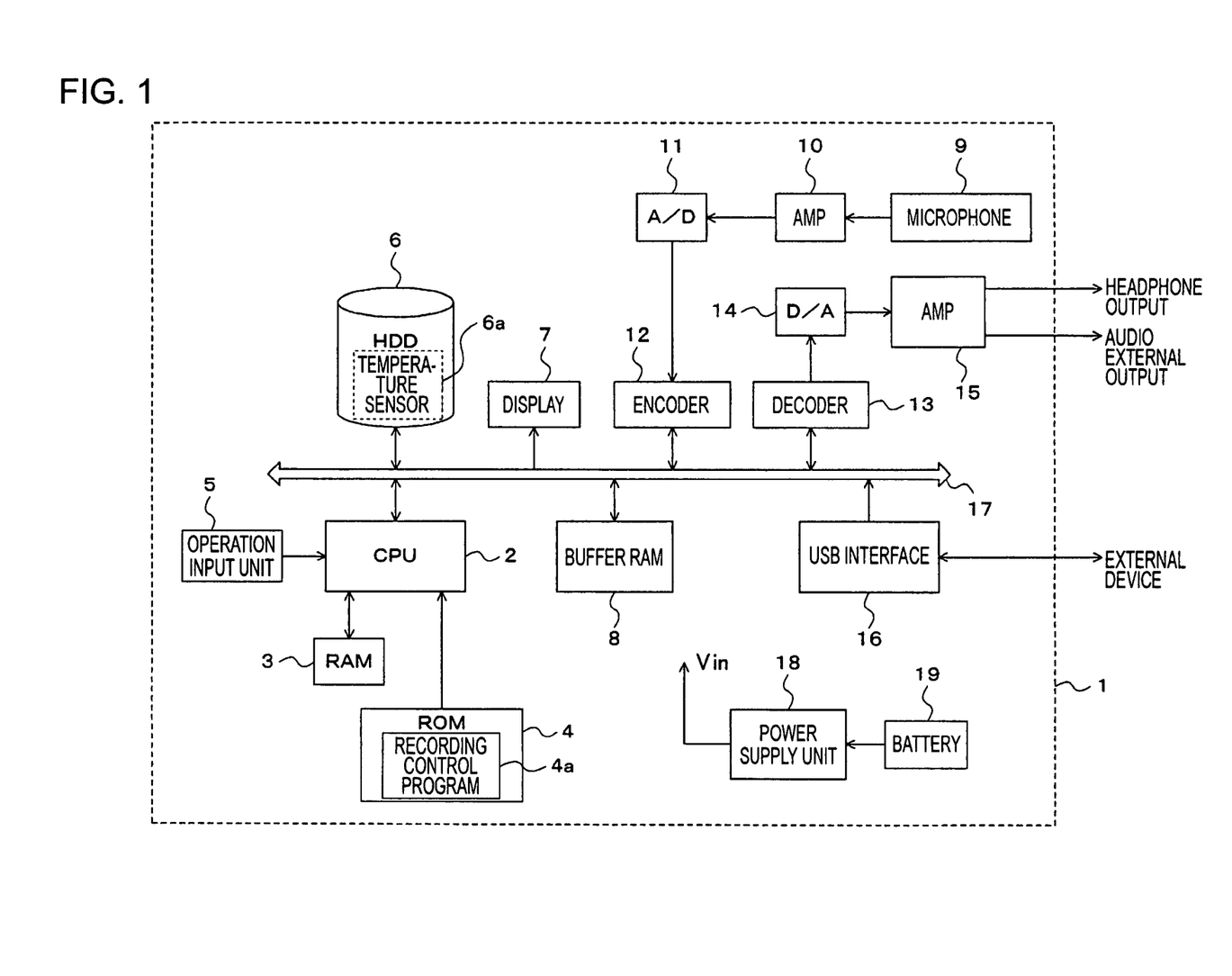
FIG. 1 is a block diagram showing the internal construction of a recording and playback apparatus according to an embodiment of the present invention.

FIG. 1 is a block diagram showing an example internal construction of a recording and playback apparatus 1 according to an embodiment of the present invention.

Referring to FIG. 1, the recording and playback apparatus 1 includes a hard disk drive (HDD) 6. The recording and playback apparatus 1 records audio data on or play back audio data from the HDD 6. The recording and playback apparatus 1 is typically used as a portable apparatus, and it includes a power supply unit 18 for supplying a power supply voltage Vin from a DC voltage of a battery 19 to other components.

Referring to FIG. 1, a central processing unit (CPU) 2 controls the entire recording and playback apparatus 1 or performs calculations according to a program activated. For example, the CPU 2 deals with input/output for a user, stores a data file on the HDD 6, creates or updates management information, and so forth.

The CPU 2 exchanges control signals or data with other components via a bus 17.

Furthermore, a random access memory (RAM) 3 and a read-only memory (ROM) 4 are provided for the CPU 2.

The ROM 4 stores operation programs for the CPU 2, a program loader, various calculation coefficients, parameters used in programs, and so forth. In this embodiment, the ROM 4 stores a recording control program 4a for allowing the CPU 2 to execute operations according to this embodiment, described later with reference to FIGS. 3 to 5.

In the RAM 3, data areas and task areas for executing programs are temporarily allocated.

In the HDD 6, data files are stored, management information is created and updated, and so forth, under the control of the CPU 2. For example, an audio data file downloaded from an external device (e.g., a personal computer) via a Universal Serial Bus (USB) interface 16 described later is stored in the HDD 6.

Furthermore, audio signals input via a microphone 9 described later are compressed according to a certain audio compression method, and the resulting audio data file is stored in the HDD 6.

In this case, the management information mentioned above includes, for example, the filename, information for managing the playback order, and so forth, for the audio data file stored in the HDD 6.

The recording control program 4 for allowing operations according to this embodiment may be stored in the HDD 6.

The HDD 6 includes a temperature sensor 6a. The temperature sensor 6a is used, for example, for internal processing within the HDD 6. That is, the HDD 6 includes a CPU that internally executes various processes needed. For example, in the HDD 6, based on the value of a temperature detected by the temperature sensor 6a, a parameter relating to the value of a current for driving a magnetic head is changed so that degradation in recording performance at low temperature is suppressed.

As temperature information used for exercising control within the HDD 6, however, generally, rough information representing suffices, for example, information representing one of three levels. Furthermore, considering the demand for cost reduction, a temperature sensor having a high precision is not actually used. Thus, it is assumed that the precision of the temperature sensor 6a is rather rough.

The CPU 2 is allowed to read, by inputting a predetermined command, information representing the value of a temperature detected by the temperature sensor 6a (hereinafter referred to as a temperature value Tmp) from the HDD 6.

An operation input unit 5 is provided, for example, as exposed on the outer surface of the case of the recording and playback apparatus 1. The operation input unit 5 has operation keys or the like, and it allows a user to enter various operation commands or to input data. Information input using the operation input unit 5 is transferred to the CPU 2 as input information regarding an operation or data. The CPU 2 performs calculation or exercises control as needed according to the information input.

A display 7 is implemented, for example, by a liquid crystal panel, and it presents various information to a user.

For example, when display data in accordance with the status of various operations, input status, and communication status is fed from the CPU 2 to the display 7, the display 7 is driven based on the display data to display corresponding information.

Furthermore, the recording and playback apparatus 1 includes, as a system for inputting recording signals to the HDD 6, a microphone 9, an amp 10, an A/D converter 11, and an encoder 12.

An audio signal acquired by the microphone 9 is fed to the amp 10 for amplification, the amplified audio signal is converted into digital audio data by the A/D converter 11, and the digital audio data is fed to the encoder 12. The encoder 12 compresses the digital audio data fed from the A/D converter 11 by a predetermined audio compression method. The resulting compressed audio data is output onto the bus 17.

The encoder 12 may be configured so that the compression rate is variable. Furthermore, the encoder 12 may be configured so that whether or not to apply compression can be selected.

Although the microphone 9 is included in the recording and playback apparatus 1 in this embodiment, alternatively, only a microphone input terminal may be provided so that a microphone can be attached thereto and detached therefrom.

As a playback system, the recording and playback apparatus 1 includes a decoder 13, a D/A converter 14, and an amp 15. The decoder 13 decodes compressed audio data to yield digital audio data. The digital audio data yielded by the decoder 13 is converted into an analog audio signal by the D/A converter 13, and the analog audio signal is amplified by the amp 15.

The analog audio signal amplified by the amp 15 can be output as a headphone output or an audio external output.

At the time of recording or playback, audio data is buffered in a buffer RAM 8.

For example, at the time of recording, audio data input via the microphone 9 and compressed by the encoder 12 is buffered, and the buffered audio data is recorded on the HDD 6.

At the time of playback, audio data read from the HDD 6 is buffered, and the buffered audio data is fed to the decoder 13 to produce a sound output.

A USB interface 16 is provided so that data communications with an external device connected via a USB cable are allowed. Various types of data, such as audio data, can be exchanged with an external device, such as a personal computer, via the USB interface 16 under the control of the CPU 2.

Other types of communications interface with external devices may be used, such as an IEEE-1394 interface.

Although the power supply unit 18 supports only input from the battery 19 in the construction shown in FIG. 1, input from a commercial AC power source may be supported.

When data is recorded on a hard disk as a storage medium as in the recording and playback apparatus 1 according to the embodiment shown in FIG. 1, as described earlier, it is known that recording performance at low temperature is degraded due to its magnetic characteristics. Thus, in a recording and playback apparatus including an HDD, data could be corrupted when a recording operation is executed at a low temperature.

Particularly if, for example, the recording operation relates to management data regarding an audio data file stored in the HDD, the corruption could disable playback of audio data, raise the need of reformatting or cause other problems.

According to the related art, in order to prevent corruption of data due to such recording at a low temperature, control is exercised so that a recording operation is not executed when the temperature is below a predetermined temperature. As described earlier, however, since a value with a sufficient margin is chosen in consideration of variation of individual HDDs or other factors as a reference value for prohibiting recording, excessive restriction tends to be imposed on recording operations.

In this embodiment, in order to avoid excessive restriction on recording operations at low temperature and to allow recording operations at lower temperatures, the following operation is executed.

As described with reference to FIG. 1, the HDD 6 includes the temperature sensor 6a. In this embodiment, a test writing operation by the HDD 6 is executed when the temperature value Tmp detected by the temperature sensor 6a is below a predetermined value th. When a signal is not correctly recorded as a result of the test writing operation, control is exercised so that recording operations are not executed.

Accordingly, it is possible to prohibit recording operations only when a signal cannot actually be recorded on the HDD 6. Thus, excessive restriction on recording operations at low temperature can be avoided. By avoiding excessive restriction, recording operations at a lower temperature are allowed compared with the related art.

Furthermore, since recording operations are prohibited only when a signal cannot actually be recorded on the HDD 6, i.e., since recording operations are allowed only when recording is actually allowable, corruption of data at low temperature can be prevented reliably.

In this case, the test writing operation is executed only when the temperature is below the predetermined temperature value th. Thus, ineffective test writing operations at high temperatures at which recording is allowable can be omitted. This serves to reduce the processing load of the CPU 2 and to reduce power consumption of the apparatus.

In this embodiment, the condition for executing the test writing operation is the temperature value Tmp being lower than the predetermined value th. More specifically, whether the temperature value Tmp is below the predetermined value th is checked only at timings of recording operations, i.e., on each occurrence of a recording operation on the HDD 6.

Accordingly, it is not needed to constantly execute comparison between the temperature value Tmp and the predetermined value th. This further reduces the processing load of the CPU 2.

Furthermore, in this case, comparison is executed by a condition that is most approximate to a condition at the time of execution of an actual recording operation. Thus, the test writing operation executed based on the comparison serves to accurately determine whether recording is allowable or not allowable.

Figure 2:
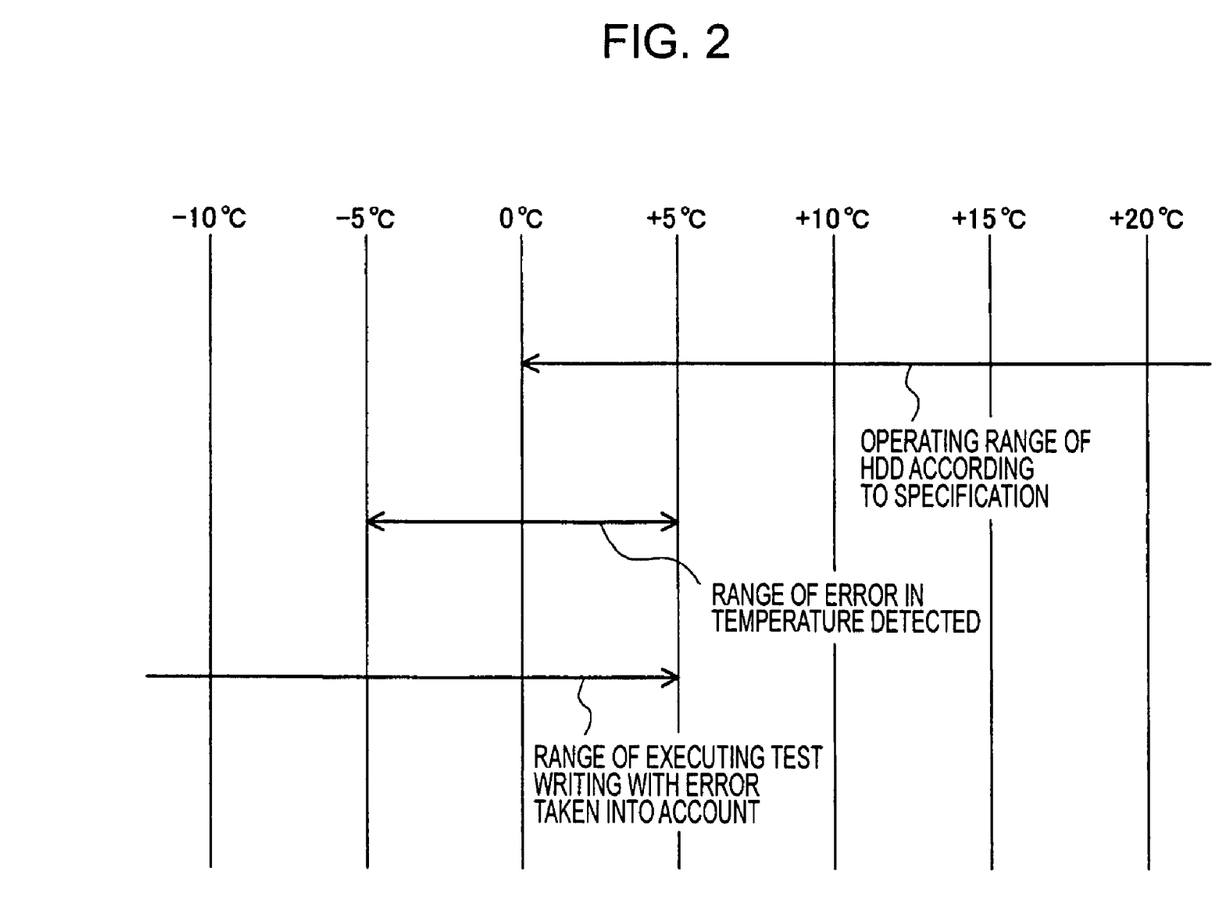
FIG. 2 is a diagram for explaining a temperature range in which a test writing operation is to be executed.

In this embodiment, the predetermined value th used to determine whether to execute a test writing operation is chosen as shown in FIG. 2.

Referring to FIG. 2, "operating range of HDD according to specification" indicates a range of temperatures at which recording on the HDD 6 is allowable. In this embodiment, for example, the range of temperatures at which recording on the HDD 6 is allowable is 0° C. and above.

Considering the range of temperatures at which recording on the HDD 6 is allowable, presumably, by choosing the predetermined value th to be 0° C., ineffective test writing operations can be omitted, serving to reduce processing load and power consumption. That is, assuming that recording operations are allowable at and above 0° C., test writing operations should be executed only below 0° C.

In this embodiment, however, as described earlier with reference to FIG. 1, it is assumed that the precision of detection by the temperature sensor 6a is rather rough. When a detection error can occur in the temperature sensor 6a, the predetermined value th should be chosen with the error taken into account.

In the example shown in FIG. 2, it is assumed that the detection error of the temperature sensor 6a is ±5° C., as indicated by "range of error in temperature detected". That is, in this case, when test writing operations are to be executed below 0° C., assuming that an error on the higher temperature side can occur in detection by the temperature sensor 6a, the predetermined value th is chosen with a margin of +5° C.

Thus, the range of temperatures in which test writing operations are executed, with reference to a temperature value detected by the temperature sensor 6a, is the range indicated as "range of executing test writing with error taken into account".

By choosing the predetermined value th with the detection error of the temperature sensor 6a taken into account as described above, even when the precision of detection by the temperature sensor 6a included in the HDD 6 is relatively rough, corruption of data at low temperature can be reliably prevented.

That is, the temperature sensor 6a included in the HDD 6, having a low precision of detection, can be used as it is, so that another temperature sensor need not be added.

The range of temperatures at which recording on the HDD 6 is allowable according to the specification, described with reference to FIG. 2, is defined while taking into account a control operation for low temperature operation exercised within the HDD 6 shown in FIG. 1. That is, even if a control operation for low temperature operation is exercised within the HDD 6, that does not affect the control operation according to the embodiment.

In this embodiment, the test writing operation is executed in an area associated with the outer circumference of the hard disk in the HDD 6.

Generally, in HDDs, constant angular velocity (CAV) is employed as a scheme for controlling disk rotation, so that the linear velocity tends to increase towards the outer circumference. In an HDD, a plurality of zones is defined in the radial direction of the disk, with the recording density being substantially the same between inner zones and outer zones. Thus, since the linear velocity increases toward the outer circumference by CAV, the transfer rate of data that is read is caused to increase toward the outer circumference, and S/N ratio tends to deteriorate accordingly. Thus, it is known that generally the quality of signal playback becomes lower toward the outer circumference in an HDD.

Thus, in this embodiment, a test writing operation is executed in an area associated with the outer circumference, determining whether to allow recording based on the result. Accordingly, the test writing operation yields a more reliable result, and this serves to prevent corruption of data more reliably.

Furthermore, in this embodiment, in the area associated with the outer circumference, an area other than an area for normal recording and playback is defined.

Generally, in a disk-shaped storage medium such as a hard disk, a normal recording and playback area in which data is recorded and played back according to instructions by a user of a recording and playback apparatus is defined, and an area that is separate from the normal recording and playback area but where recording and playback of data is similarly possible is also defined. For example, a manufacturer-managed area where specific data can be recorded and played back by the manufacturer of the HDD 6 exists.

Usually, the manufacturer-managed area is provided in the outermost area of a hard disk. Thus, when a test writing operation is executed in this area, the test writing operation is executed in an area associated with the outer circumference and outside the normal recording and playback area as described above.

When the test writing operation is executed in an area outside the normal recording and playback area, the operation according to the embodiment can be achieved without reducing the nominal storage capacity of the hard disk, i.e., the storage capacity of the normal recording and playback area.

An operation that is to be executed by the recording and playback apparatus 1 in order to achieve the recording controlling operation according to the embodiment described above will be described with reference to a flowchart shown in FIG. 3.

Figure 3:
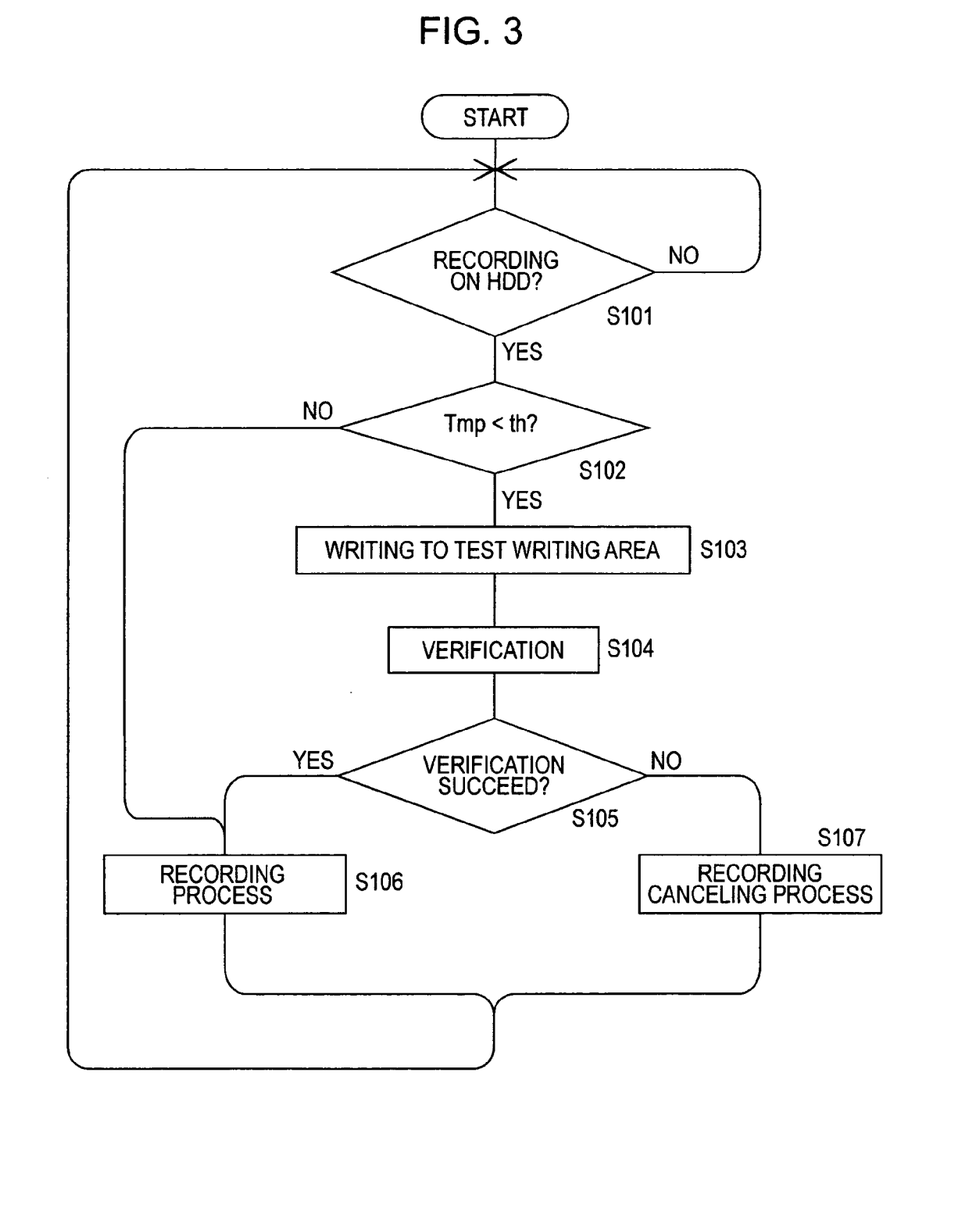
FIG. 3 is a flowchart of a recording controlling operation according to the embodiment.

The operation shown in FIG. 3 is executed by the CPU 2 according to the recording control program 4a stored, for example, in the ROM 4.

Referring to FIG. 4, first, in step S101, the CPU 2 waits for occurrence of a recording operation on the HDD 6. That is, the CPU 2 monitors instructions for recording audio data on the HDD 6, instructions for recording data input from the operation input unit 5 in relation to editing of an audio data file, or the like, waiting for a state where a recording operation on the HDD 6 is to be executed.

When occurrence of a recording operation is recognized, in step S102, the CPU 2 checks whether a temperature value Tmp detected by the temperature sensor 6a is below the predetermined value th.

When it is determined that the temperature value Tmp is below the predetermined value th, the operation proceeds to step S106, in which a recording process is executed according to a recording instruction detected in step S101.

Thus, when a recording operation occurs, if the temperature value Tmp is at or above the predetermined temperature, a recording operation on the HDD 6 is allowed without executing a test writing operation.

When it is determined in step S102 that the temperature value Tmp is below the predetermined value th, in step S103, a signal is written to a test writing area. That is, a certain signal is written to an area associated with the outer circumference of the hard disk in the HDD 6, which is outside the normal recording and playback area.

Then, in step S104, verification is executed. That is, it is checked whether the signal has been correctly written based on the result of reading the signal written.

In step S105, the result of the verification is checked. When it is determined by the checking that the signal has been correctly written, the operation proceeds to step S106. That is, in this case, it is determined that a signal can be recorded on the HDD 6, so that the recording process is executed.

On the other hand, when it is determined by the verification that the signal has not been correctly written, the operation proceeds to step S107, in which a recording canceling process is executed.

More specifically, in the recording canceling process, an error message indicating that recording is not allowable is displayed on the display 7. Then, control is exercised so that a recording operation according to the recording instruction detected in step S101 is not executed.

Then, after step S106 or step S107 is executed, the operation returns to step S101, and occurrence of a recording operation is monitored again.

In the operation described above, the temperature value Tmp is compared with the predetermined value on each occurrence of a recording operation. Alternatively, the temperature comparison may be executed at the time of power on of the recording and playback apparatus 1 and subsequently at a predetermined time interval.

In this case, the temperature value Tmp is compared with the predetermined threshold th at the time of power on and subsequently at intervals of a predetermined time length. A test writing operation is executed when the temperature value Tmp is below the predetermined value th. Then, information indicating whether recording is allowable or not allowable is held until a recording operation occurs. When a recording operation occurs, whether or not a recording operation is to be actually allowed is determined based on the information held.

Figure 4:
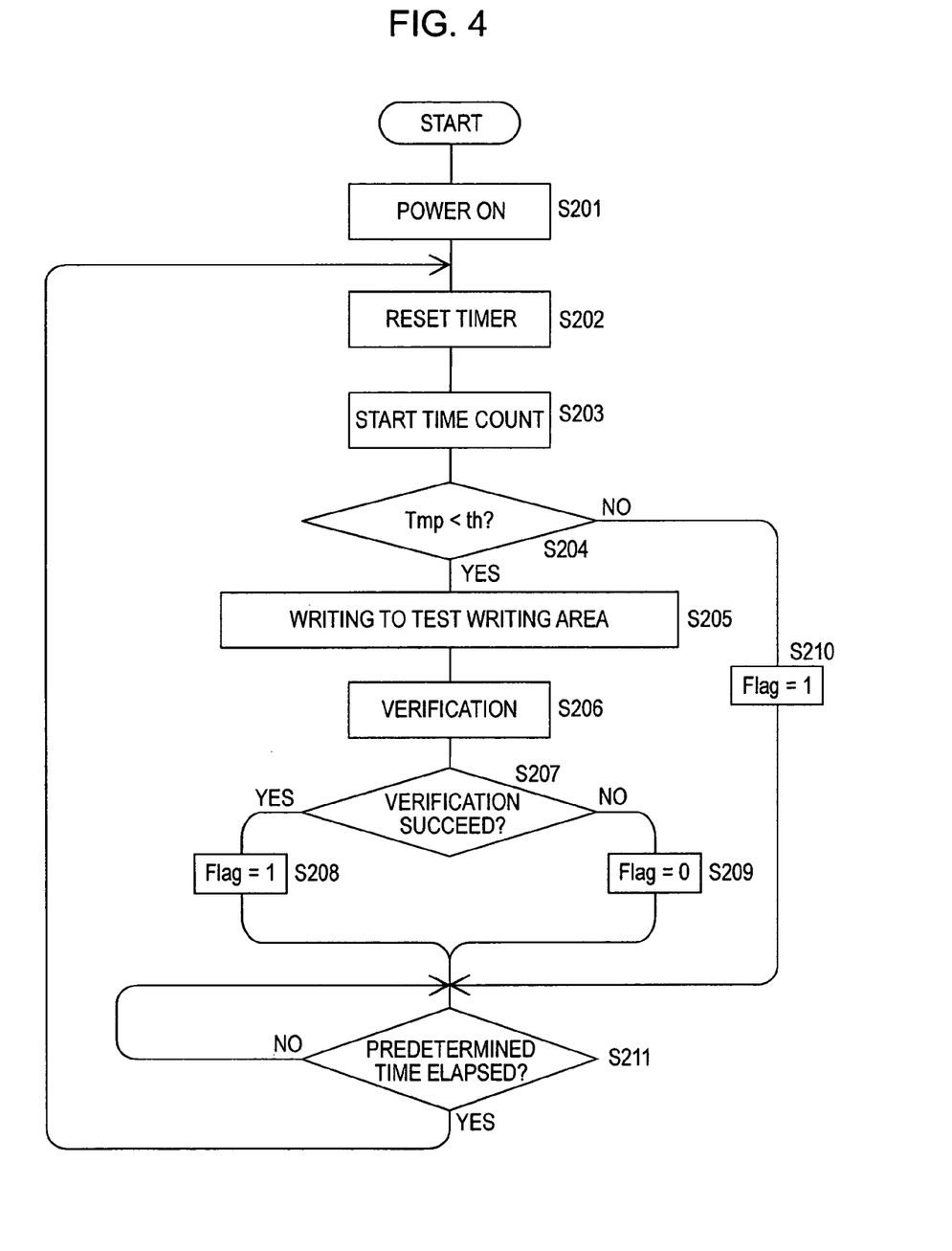
FIG. 4 is a flowchart of another recording controlling operation according to the embodiment.

Operations that are executed in this case will be described with reference to flowcharts shown in FIGS. 4 and 5. Also in this case, the operations are executed by the CPU 2 according to the recording control program 4a.

First referring to FIG. 4, the operation up to holding information representing whether recording is allowable or not allowable will be described.

First, in step S201, for example, in response to an operation for power on via the operation input unit 5, processing for power on is executed. That is, for example, in response to an operation input for power on, power supply from the power supply unit 18 to other components is started. Although not shown, even when the recording and playback apparatus 1 is powered off, a standby power is supplied from the power supply unit 18 to the CPU 2.

In step S202, the timer is reset. Then, in step S203, time count by the timer is started.

Then, in step S204, it is checked whether the temperature value Tmp detected by the temperature sensor 6a in the HDD 6 is below the predetermined value th.

When it is determined that the temperature value Tmp is not below the predetermined value th, the operation proceeds to step S210, in which a flag indicating whether recording is allowable or not allowable is set to 1, which indicates that recording is allowable. That is, since the temperature in this case is at or above the predetermined value th, it is presumed that recording on the HDD 6 is allowable, so that the flag is set to 1.

On the other hand, when it is determined in step S204 that the temperature value Tmp is below the predetermined value th, in step S205, a signal is written to the test writing area. That is, also in this case, a certain signal is written to an area outside the normal recording and playback area.

Then, in step S206, verification is executed. Then, in step S207, it is checked according to the result of the verification whether the signal has been correctly written.

When it is determined that the signal has been correctly written, the operation proceeds to step S208, in which the flag is set to 1, indicating that recording of signals on the HDD 6 is allowable.

On the other hand, when it is determined by the verification that the signal has not been correctly written, the operation proceeds to step S209, in which the flag is set to 0, indicating that recording is not allowable.

After executing step S208 or step S209, the operation proceeds to step S211, waiting for a predetermined time to elapse. That is, based on the time counting started in step S203, the operation waits for a predetermined time to elapse.

When the predetermined time has elapsed, the operation returns to step S202. Then, the timer is reset and time counting is started, and temperature comparison in step S204 and subsequent steps are executed. That is, after temperature comparison following power on is executed, the temperature comparison and subsequent processing described above is repeated at intervals of a predetermined time length. Thus, information indicating whether recording is allowable or not allowable, which is obtained based on the result of actual temperature comparison or test writing operation, is maintained while being updated at the intervals of the predetermined time length.

Figure 5:
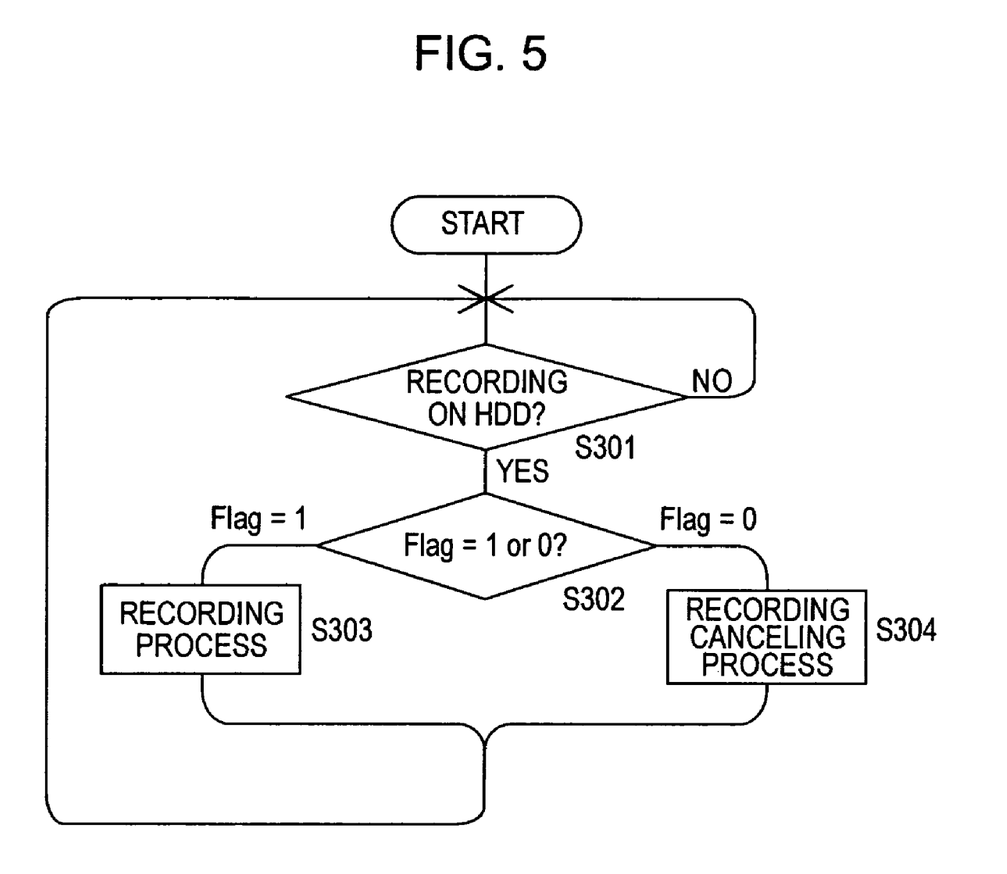
FIG. 5 is a flowchart of another recording controlling operation according to the embodiment.

FIG. 5 is a flowchart of an operation that is executed to determine whether or not to allow a recording operation based on the information indicating whether recording is allowable or not allowable.

First, in step S301, similarly to step S101 shown in FIG. 3, the operation waits for occurrence of a recording operation on the HDD 6.

When a recording operation occurs, in step S302, it is checked whether the flag indicating whether recording is allowable or not allowable is set to 1 or set to 0.

When it is determined that the flag is set to 1, a recording process is executed in step S303. This recording process is the same as that in step S106 described earlier.

On the other hand, when it is determined that the flag is set to 0, a recording canceling process is executed in step S304. That is, when it is determined that the flag is set to 0, indicating that recording operation is not allowable, an error message is displayed, and control is exercised so that the recording operation is canceled.

After executing step S303 or step S304, the operation returns to step S301, and the operation again waits for occurrence of a recording operation on the HDD 6.

In the operations described with reference to FIGS. 4 and 5, temperature comparison is executed at the time of power on as well as at intervals of a predetermined time length. At the time of power on, it is likely that the power has been off and the apparatus has been cooled down, so that temperature detection at the time of power on is effective to reliably prevent data corruption at low temperature.

In the embodiment described above, comparison between the temperature value Tmp and the predetermined value th is executed at specific timing, for example, at the time of occurrence of a recording operation, at the time of power on, or at intervals of a predetermined time length, and test writing is executed in accordance with the result of the comparison. Since the test writing is executed based on the result of the temperature comparison, ineffective test writing operations at high temperature can be omitted, serving to reduce processing load and power consumption.

However, particularly when the operation is iterated based on the elapse of a predetermined time, alternatively, the temperature comparison may be omitted, executing test writing directly based on the elapse of the predetermined time.

However, when the temperature comparison is omitted, although the advantage of reliably preventing data corruption at low temperature can be maintained, it is not possible to omit ineffective test writing operations at high temperature.

Thus, when the test writing operation is executed without executing temperature comparison, the following measure should be taken.

In one method, the temperature sensor 6a is used. That is, the temperature value Tmp is sampled, for example, at intervals of a predetermined time length. Based on the result of the sampling, it is checked whether the temperature value tends to increase or tends to decrease. When it is determined that the temperature value Tmp tends to increase, the test writing operation is executed at intervals of a longer time length.

Accordingly, the number of times of the test writing operation is reduced when the temperature tends to increase, serving to reduce processing load and power consumption.

In another method, the temperature sensor 6a is not used. In this case, for each test writing operation, playback error rate for the signals written is sampled. When it is observed that the playback error rate tends to decrease, the test writing operation is executed at intervals of a longer time length.

When the playback error rate tends to decrease, it can be presumed that the temperature tends to increase. Thus, also in this case, it is possible to execute the test writing operation at intervals of a longer time length when the temperature tends to increase. Accordingly, the number of times of the test writing operation is reduced, serving to reduce processing load and power consumption.

Although the embodiment has been described in the context of the example where the temperature sensor 6a is included in the HDD 6, the temperature sensor 6a need not necessarily be included in the HDD 6 as long as the temperature sensor 6a is included in the recording and playback apparatus 1.

Temperature detecting means is not limited to a temperature sensor, and may be other means for detecting a factor representing temperature change.

For example, the value of a current obtained by the power supply unit 18 tends to increase as the temperature decreases. Thus, the arrangement may be such that the result of detecting the value of the current is used as information representing a temperature value.

Furthermore, although the test writing area is defined in an area associated with the outer circumference and outside the normal recording and playback area, the test writing area is not particularly limited, and may be defined, for example, in the normal recording and playback area.

However, when test writing operation is executed within the normal recording and playback area, in order to avoid reducing storage capacity of the storage medium, for example, the following measures may be taken.

First, the test writing area provided within the normal recording and playback area is defined as an area not exclusive for the test writing operation, and recording of normal recording and playback data is allowed. At the time of the test recording operation, if data has already been written to this area, the data is read and is temporarily stored. Then, the test writing operation is executed in the area. Then, the data stored is recorded back to the area. Accordingly, even when the test writing area is defined in the normal recording and playback area, the capacity of the storage medium is not reduced.

Furthermore, although the embodiment has been described in the context of the recording/playback apparatus 1 that records and plays back audio data alone, in addition, recording and playback of video data may be allowed. Furthermore, a camera block may be provided to form a camera apparatus that allows recording and playback of captured video or image data. That is, data to be recorded or played back by a recording and playback apparatus is not particularly limited.

Furthermore, although the embodiment has been described in the context of an example where a hard disk is used as storage means for recording and playback by the recording/playback apparatus 1, storage means is not limited thereto, and may be other media on which signals are recorded using magnetic heads, for example, magneto-optical discs such as mini discs (MD).

Furthermore, the recording control program 4a described in relation to the embodiment may be read by the recording/playback apparatus 1 from a recording medium having recorded the program thereon, such as a CD-ROM or a memory card, and executed by the CPU 2.

It should be understood by those skilled in the art that various modifications, combinations, sub-combinations and alterations may occur depending on design requirements and other factors insofar as they are within the scope of the appended claims or the equivalents thereof.

What is claimed is:

1. A recording and playback apparatus comprising:
   recording and playback means for recording a signal on a storage medium and for playing back the signal recorded on the storage medium, the recording and playback means at least having a magnetic head;
   temperature detecting means for detecting a temperature; and
   controlling means for executing a test writing controlling process of controlling the recording and playback means so that a test writing operation on the storage medium is executed according to a result of temperature detection by the temperature detecting means, for executing a checking process of checking whether a signal has been correctly written by the test writing operation, and for executing a recording controlling process of controlling a recording operation on the storage medium by the recording and playback means according to a result of the checking in the checking process.

2. The recording and playback apparatus according to claim 1, wherein the controlling means, as the test writing controlling process, controls the recording and playback means so that the test writing operation is executed when a temperature value detected by the temperature detecting means is below a predetermined value.

3. The recording and playback apparatus according to claim 1, wherein the controlling means, as the recording controlling process, exercises control so that the recording operation on the storage medium is executed when it is determined by the checking process that the signal has been correctly written.

4. The recording and playback apparatus according to claim 1, wherein the controlling means, as the recording controlling process, exercises control so that the recording operation on the storage medium is not executed when it is determined by the checking process that the signal has not been correctly written.

5. The recording and playback apparatus according to claim 1, wherein the controlling means further executes a display controlling process of displaying an error message on certain display means when it is determined by the checking process that the signal has not been correctly written.

6. The recording and playback apparatus according to claim 1, wherein the controlling means, as the test writing controlling process, controls the recording and playback means so that the test writing operation is executed outside an area where normal recording and playback are executed on the storage medium.

7. The recording and playback apparatus according to claim 1, wherein the controlling means, as the test writing controlling process, controls the recording and playback means so that the test writing operation is executed in an area associated with an outer circumference of a disk-shaped storage medium.

8. The recording and playback apparatus according to claim 1, wherein the controlling means executes the test writing controlling process based on a timing of the recording operation executed by the recording and playback means.

9. The recording and playback apparatus according to claim 1, wherein the controlling means executes the test writing controlling process when the recording and playback apparatus is powered on.

10. The recording and playback apparatus according to claim 1, wherein the controlling means executes the test writing controlling process at intervals of a predetermined time length.

11. A recording controlling method for a recording and playback apparatus including recording and playback means for recording a signal on a storage medium and for playing back the signal recorded on the storage medium, the recording and playback means at least having a magnetic head, and including temperature detecting means for detecting a temperature, the recording controlling method comprising the steps for:
   controlling the recording and playback means so that a test writing operation on the storage medium is executed according to a result of temperature detection by the temperature detecting means;

checking whether a signal has been correctly written by the test writing operation; and controlling a recording operation on the storage medium by the recording and playback means according to a result of the checking.

12. A recording medium having recorded thereon a program that is executed by a recording and playback apparatus including recording and playback means for recording a signal on a storage medium and for playing back the signal recorded on the storage medium, the recording and playback means at least having a magnetic head, and including temperature detecting means for detecting a temperature, the program comprising the steps for:

controlling the recording and playback means so that a test writing operation on the storage medium is executed according to a result of temperature detection by the temperature detecting means;

checking whether a signal has been correctly written by the test writing operation; and controlling a recording operation on the storage medium by the recording and playback means according to a result of the checking.

* * * * *